Feb. 4, 1941.　　　　　M. BORDEN　　　　　2,230,583
SQUEEGEE
Filed March 30, 1940
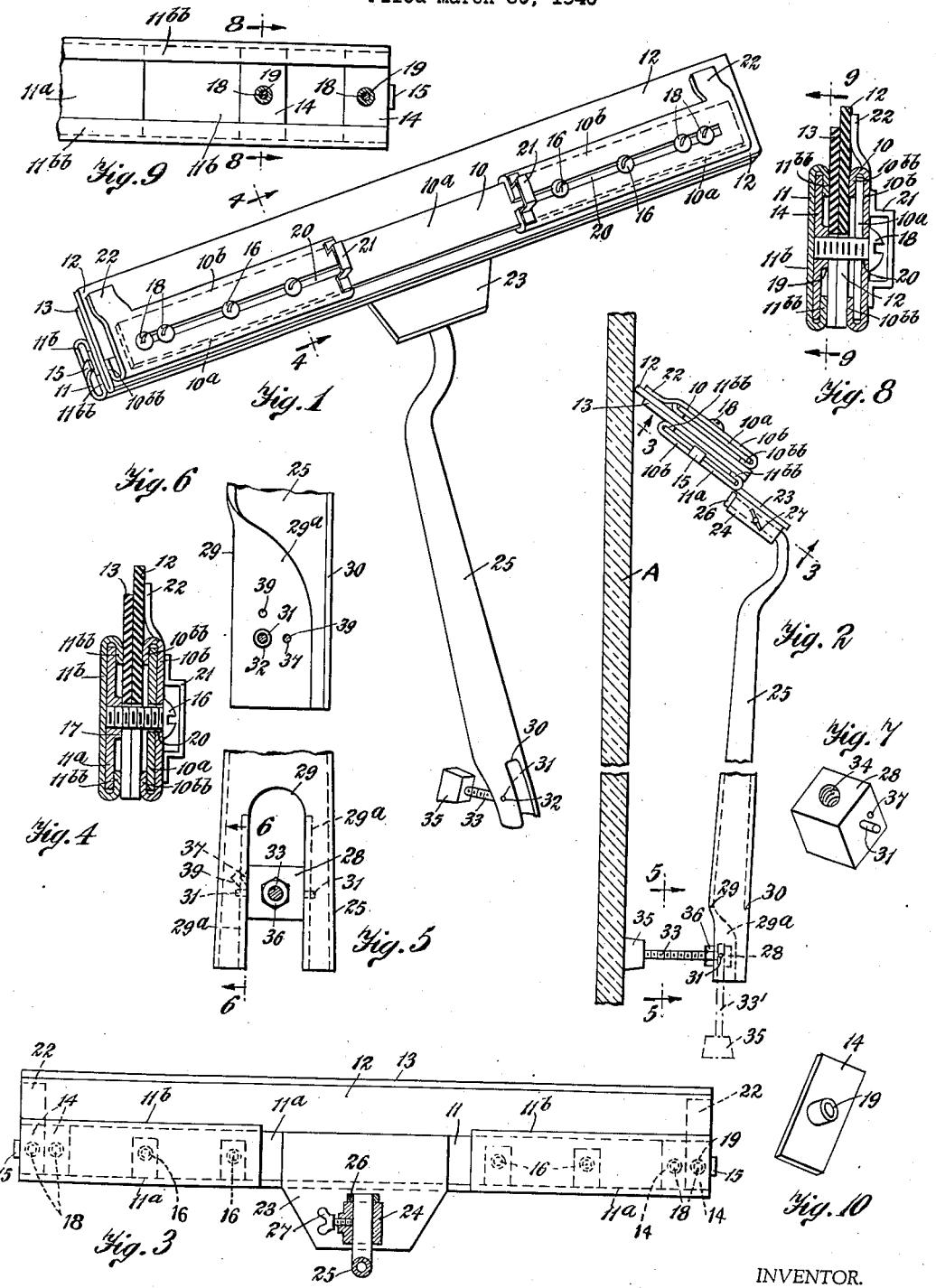
INVENTOR.
Max Borden
BY
ATTORNEY.

Patented Feb. 4, 1941

2,230,583

UNITED STATES PATENT OFFICE 2,230,583

SQUEEGEE

Max Borden, New York, N. Y.

Application March 30, 1940, Serial No. 326,848

8 Claims. (Cl. 15—245)

This invention relates to new and useful improvements in a squeegee.

More specifically, the invention proposes the construction of a squeegee having an adjustable head arranged in a manner to be adjusted to accommodate rubber strips of different lengths to permit the operative size of the squeegee to be adjusted to meet the requirements of differently sized windows.

Still further it is proposed to provide a means for releasably clamping the rubber strips between the adjacent faces of a front strip unit and a rear strip unit in a manner so that the strip units may be separated for releasing the rubber strips.

A further object of this invention is the construction of each of the strip units of separate sections slidably engaging each other in such a manner that they may be increased or decreased in length as desired.

Still further it is proposed to provide a handle for the squeegee which has one of its ends swivelly attached to one of the strip units to permit the handle to assume various pivoted positions with relation to the head of the squeegee to permit the device to be adjusted for use on windows having a limited amount of space at the edges thereof.

Still further it is proposed to provide the squeegee with a gauge for engagement with the window pane being cleaned for holding the squeegee at a proper angle to cause the exposed edges of the rubber strips to engage the window pane at a proper angle to flawlessly wipe the water therefrom.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a squeegee constructed in accordance with this invention.

Fig. 2 is an end elevational view of the squeegee shown in position upon a window pane, shown in section.

Fig. 3 is a bottom sectional view of the squeegee looking in the direction of the line 3—3 of Fig. 2.

Fig. 4 is an enlarged sectional view taken on the line 4—4 of Fig. 1.

Fig. 5 is an enlarged sectional view taken on the line 5—5 of Fig. 2.

Fig. 6 is a vertical sectional view taken on the line 6—6 of Fig. 5.

Fig. 7 is a perspective view of a certain block, per se, shown in Fig. 5.

Fig. 8 is a sectional view similar to Fig. 4 but taken at the position of the line 8—8 in Fig. 9.

Fig. 9 is a sectional view taken on the line 9—9 of Fig. 8 and illustrating an extended position of one end of the rear strip unit.

Fig. 10 is a perspective view of one of the narrow plates per se, shown in Fig. 9.

The squeegee, according to this invention, comprises a front strip unit 10 having a central strip section 10a and end strip sections 10b. The end strip sections 10b are slidably supported on the ends of the central strip section 10a by bent edge portions 10bb of the end strip sections 10b engaging the edges of the central strip section 10a. This causes the end strip sections 10b to be telescopically engaged on the ends of the central strip portion 10a. A rear strip unit 11 is constructed similarly to the front strip unit 10 and comprises a central strip section 11a and end strip sections 11b. The end strip sections 11b are slidably engaged upon the ends of the central section 11a by bent edges 11bb of the end strip sections engaging around the edges of the central strip section 11a. This causes the end strip sections 11b to be telescopically supported upon the ends of the central strip section 11a for permitting the length of the rear strip unit 11 to be adjusted similar to any adjustments made to the front strip section 10.

Narrow strips of rubber material 12 and 13 are engaged between the adjacent faces of the front strip unit 10 and the rear strip unit 11. These rubber strips 12 and 13 are in face contact with each other, and the strip 12 is slightly wider than the strip 13. The adjacent bottom edges of the strips 12 and 13 are arranged flush with each other and the top edge of the strip 12 is projected slightly beyond the top edge of the strip 13.

Narrow plates 14 are slidably mounted on the outer end portions of the end strip sections 11b of the rear strip unit 11. These narrow plates 14 have their ends engaged beneath the inturned edges 11bb of the end strip sections 11b for slidably supporting the same thereon. The free ends of the end strip sections 11b are provided with lugs 15 extended to the same sides of the end strip sections 11b as the edges 11bb, for acting as a means for preventing the narrow plates 14 from being accidentally disengaged from the end strip sections 11b. The central strip portion 11a of the strip unit 11 is slightly shorter than the central strip portion 10a of the front strip unit 10 and in the completely collapsed position of the squeegee, as shown in Figs. 1 and 3, the narrow plates 14 occupy that space within the end sections 11b provided by the shortened central section 11a.

Screws 16 are mounted on the end strip sections 10b of the front strip unit 10 and pass through openings in the central strip section 10a and openings in the rubber strips 12 and 13 and engage the central strip portion 11a of the strip unit 11. This central strip portion 11a is formed with inwardly extended bosses 17 into which the ends of the screws 16 threadedly engage for drawing the front and rear strip units together. Similarly, screws 18 are mounted on the end strip sections 10b of the front strip unit 10 and pass through openings in the central strip section 10a and openings in the rubber strips 12 and 13 and engage the narrow plates 14 of the rear unit 11. These narrow plates 14 are also provided with bosses 19 into which the screws 18 are threadedly engaged for drawing the front and rear strip units together.

The screws 16 and 18 pass through inwardly extended elongated slots 20 formed in the end strip sections 10b of the front strip unit 10. These slots 20 extend inwards from the adjacent inner ends of the end strip sections 10b. Bridging elements 21 are attached to the material of the end strip sections 10b on opposite sides of the slots 20 for connecting the opposite sides thereof together, and the bridging elements further bridge the open end of the slots 20 so as not to interfere with the passage of the heads of the screws 16 and 18 from the slot 20 when the screws are in their loosened position and the end strip sections 10b are moved outwards. This permits the end strip sections 10b to be freely slid on the ends of the central section 10a. The outer ends of the end sections 10b are provided with upwardly extending fingers 22 which engage the front face of the strip 12 at the ends thereof for stiffening these ends and causing the same to bear evenly against the window pane, as shown in Fig. 2.

The rear strip unit 11 has a plate 23 securely attached to the central portion of its central strip section 11a (see Fig. 3). This plate 23 projects beyond the rear edge of the rear strip unit 11 and carries a tubular socket 24. A handle 25, constructed of tubular material has one of its ends swivelly engaged through the socket 24, and the end thereof is provided with a head 26 for preventing the handle 25 from being accidentally disengaged from the tubular socket 24. A thumb screw 27 is threadedly engaged through one side of the socket 24 and bears against the end of the handle 25 for fixedly holding the handle in position upon the squeegee. The screw 27 may be loosened for freeing the handle 25 for permitting the same to be swivelled into any desired angular position for permitting the squeegee to be used for wiping the edges of windows having a limited amount of space at the sides thereof.

The free end of the handle 25 is further provided with a gauge for causing the rubber strips 12 and 13 to be held at a proper angle with relation to the window pane being cleaned for causing water thereon to be flawlessly wiped off. This gauge comprises a block 28 mounted within the end portion of the handle 25. To accomplish this the end of the handle 25 is provided with cutouts 29 and 30 aligned with each other and in the front and rear faces thereof. The material 29a cut from the handle 25 to form the opening 29 is bent rearwards and extends from opposite sides of the opening 29. The block 28 is provided with outwardly extending trunnion elements 31 which engage complementary openings 32 formed in the rearwardly bent flanges 29a for swivelly supporting the block 28. A screw 33 is threadedly engaged through the block 28. The block 28 is formed with a threaded opening 34 for the screw 33, which extends at right angles to an imaginary line coaxially extended through the trunnion elements 31. The free end of the screw 33 carries a rubber abutment or head 35 which is adapted to bear against the window pane A as shown in Fig. 2.

The screw 33 is adapted to be adjusted inwards and outwards with relation to the block 28 to permit the same to be adjusted to meet particular requirements, and to cause the strips 12 and 13 to properly engage the window pane. A lock nut 36 is threadedly engaged on the screw 33 and is adapted to be clamped against the adjacent face of the block 28 for locking the screw 33 in its adjusted positions. A means is further provided for holding the gauge in a position extended at right angles to the handle 25 or in a position extended longitudinally from the end of the handle as illustrated by the dot and dash lines 33' in Fig. 2. One side of the block 28 is provided with an outwardly extended projection 37 which is selectively engageable with one of a pair of inwardly extended recesses 39 formed on the adjacent face of one of the rearwardly extended flanges 29a of the handle 25.

The operation of this invention is as follows:

The squeegee is sold with a plurality of rubber strips 12 and 13 of different lengths, and possibly widths, which are adapted to be selectively engaged between the adjacent faces of the front and rear strip units 10 and 11. Note is taken of the sizes of the windows to be washed, and rubber strips of a convenient length are engaged between the adjacent faces of the strip units 10 and 11 for a particular group of windows, as hereinbefore described. The squeegee is then ready for use. To flawlessly wipe the window the rubber elements 12 and 13 are engaged against the pane A to be wiped and the gauge is brought into play by causing the screw 33 to be extended at right angles to the free end of the handle 25. The abutment or head 35 is then caused to bear against the pane A at points below the rubber elements 12 and 13, and the squeegee is moved downwards in a manner similar to all squeegees.

Due to the fact that the gauge has been set to cause the rubber elements 12 and 13 to be properly angularly positioned with relation to the pane of glass, all of the water thereon will be wiped therefrom and no streaks will remain on the pane of glass with one good stroke.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a squeegee, a front strip unit having a central strip section and end strip sections with inwardly bent edge portions engaging the edges of said central strip section whereby the end strip sections are slidably mounted on the central strip section, a rear strip unit having a central strip section and end strip sections with inwardly bent edge portions engaging the edges of said latter central strip section whereby the latter end strip sections are slidably mounted on the latter central strip section, rubber strips between said front and rear strip units, narrow plates slidably mounted on the outer end portions of the end strip sections of said rear strip unit, and fastening elements mounted on the end strip sections of said front strip unit and passing through openings in said rubber strips and engaging the central strip section and the narrow plates of said rear strip unit.

2. In a squeegee, a front strip unit having a central strip section and end strip sections with inwardly bent edge portions engaging the edges of said central strip section whereby the end strip sections are slidably mounted on the central strip section, a rear strip unit having a central strip section and end strip sections with inwardly bent edge portions engaging the edges of said latter central strip section whereby the latter and strip sections are slidably mounted on the latter central strip section, rubber strips between said front and rear strip units, narrow plates slidably mounted on the outer end portions of the end strip sections of said rear strip unit, and fastening elements mounted on the end strip sections of said front strip unit and passing through openings in said rubber strips and engaging the central strip section and the narrow plates of said rear strip unit, said fastening elements being in the form of screws.

3. In a squeegee, a front strip unit having a central strip section and end strip sections with inwardly bent edge portions engaging the edges of said central strip section whereby the end strip sections are slidably mounted on the central strip section, a rear strip unit having a central strip section and end strip sections with inwardly bent edge portions engaging the edges of said latter central strip section whereby the latter end strip sections are slidably mounted on the latter central strip section, rubber strips between said front and rear strip units, narrow plates slidably mounted on the outer end portions of the end strip sections of said rear strip unit, and fastening elements mounted on the end strip sections of said front strip unit and passing through openings in said rubber strips and engaging the central strip section and the narrow plates of said rear strip unit, said fastening elements being in the form of screws, said central strip section of said rear strip unit and said narrow plates being formed with bosses into which said screws are adapted to be threadedly engaged.

4. In a squeegee, a front strip unit having a central strip section and end strip sections with inwardly bent edge portions engaging the edges of said central strip section whereby the end strip sections are slidably mounted on the central strip section, a rear strip unit having a central strip section and end strip sections with inwardly bent edge portions engaging the edges of said latter central strip section whereby the latter end strip sections are slidably mounted on the latter central strip section, rubber strips between said front and rear strip units, narrow plates slidably mounted on the outer end portions of the end strip sections of said rear strip unit, and fastening elements mounted on the end strip sections of said front strip unit and passing through openings in said rubber strips and engaging the central strip section and the narrow plates of said rear strip unit, said fastening elements being extended through elongated slots formed in the end strip sections of said front strip unit, said slots being extended inwards from the adjacent ends of the end strip sections, and bridging elements attached to the material of said end strip sections on either side of said slot for connecting the ends of said strip sections together.

5. In a squeegee, a front strip unit having a central strip section and end strip sections with inwardly bent edge portions engaging the edges of said central strip section whereby the end strip sections are slidably mounted on the central strip section, a rear strip unit having a central strip section and end strip sections with inwardly bent edge portions engaging the edges of said latter central strip section whereby the latter end strip sections are slidably mounted on the latter central strip section, rubber strips between said front and rear strip units, narrow plates slidably mounted on the outer end portions of the end strip sections of said rear strip unit, and fastening elements mounted on the end strip sections of said front strip unit and passing through openings in said rubber strips and engaging the central strip section and the narrow plates of said rear strip unit, said end strip sections of said front strip unit being formed with upwardly extending fingers for engaging the ends of said rubber strips for imparting rigidity thereto.

6. In a squeegee, a front strip unit, a rear strip unit attached to said front strip unit, rubber strips between said front and rear units, a handle for the squeegee attached on one of said units, and a gauge mounted on the squeegee for engaging a window pane being cleaned with the squeegee and adapted to hold said rubber strips at a predetermined angle to said window pane, said gauge comprising a block turnably mounted within the end of said handle, a screw threadedly engaged through said block, and an abutment mounted on the free end of said screw and engageable against said window pane.

7. In a squeegee, a front strip unit, a rear strip unit attached to said front strip unit, rubber strips between said front and rear units, a handle for the squeegee attached on one of said units, and a gauge mounted on the squeegee for engaging a window pane being cleaned with the squeegee and adapted to hold said rubber strips at a predetermined angle to said window pane, said gauge comprising a block turnably mounted within the end of said handle, a screw threadedly engaged through said block, and an abutment mounted on the free end of said screw and engageable against said window pane, and means for holding said screw in a position in which said abutment will be engaged against said window pane or in which said screw will be extended coaxially from the end of said handle.

8. In a squeegee, a front strip unit, a rear strip unit attached to said front strip unit, rubber strips between said front and rear units, a handle for the squeegee attached on one of said units, and a gauge mounted on the squeegee for engaging a window pane being cleaned with the squeegee and adapted to hold said rubber strips at a predetermined angle to said window pane, said gauge comprising a block turnably mounted within the end of said handle, a screw threadedly engaged through said block, and an abutment mounted on the free end of said screw and engageable against said window pane, and means for holding said screw in a position in which said abutment will be engaged against said window pane or in which said screw will be extended coaxially from the end of said handle, said means comprising a projection formed on said block and selectively engageable with complementary recesses formed in an adjacent portion of said handle.

MAX BORDEN.